Patented Apr. 8, 1947

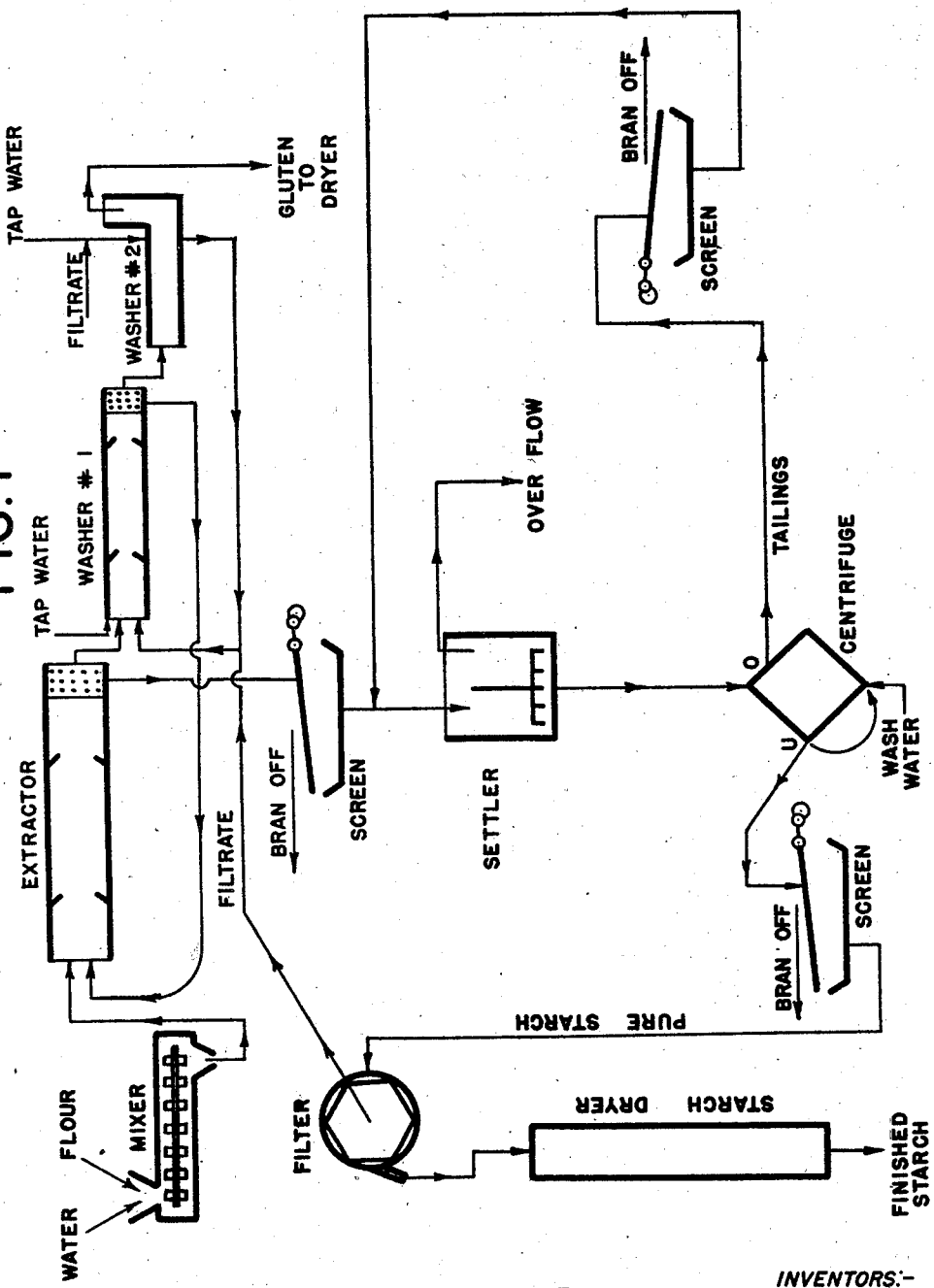

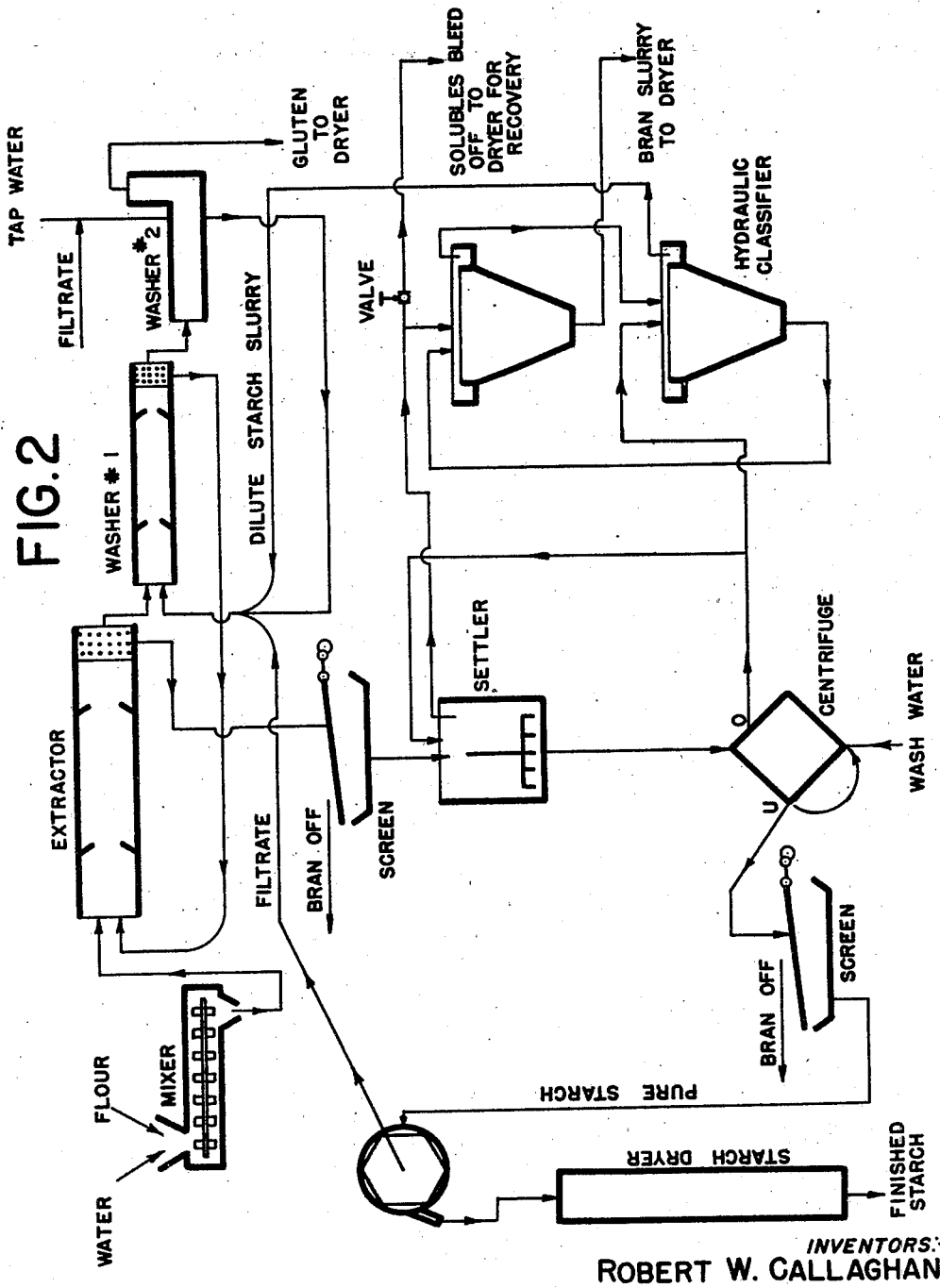

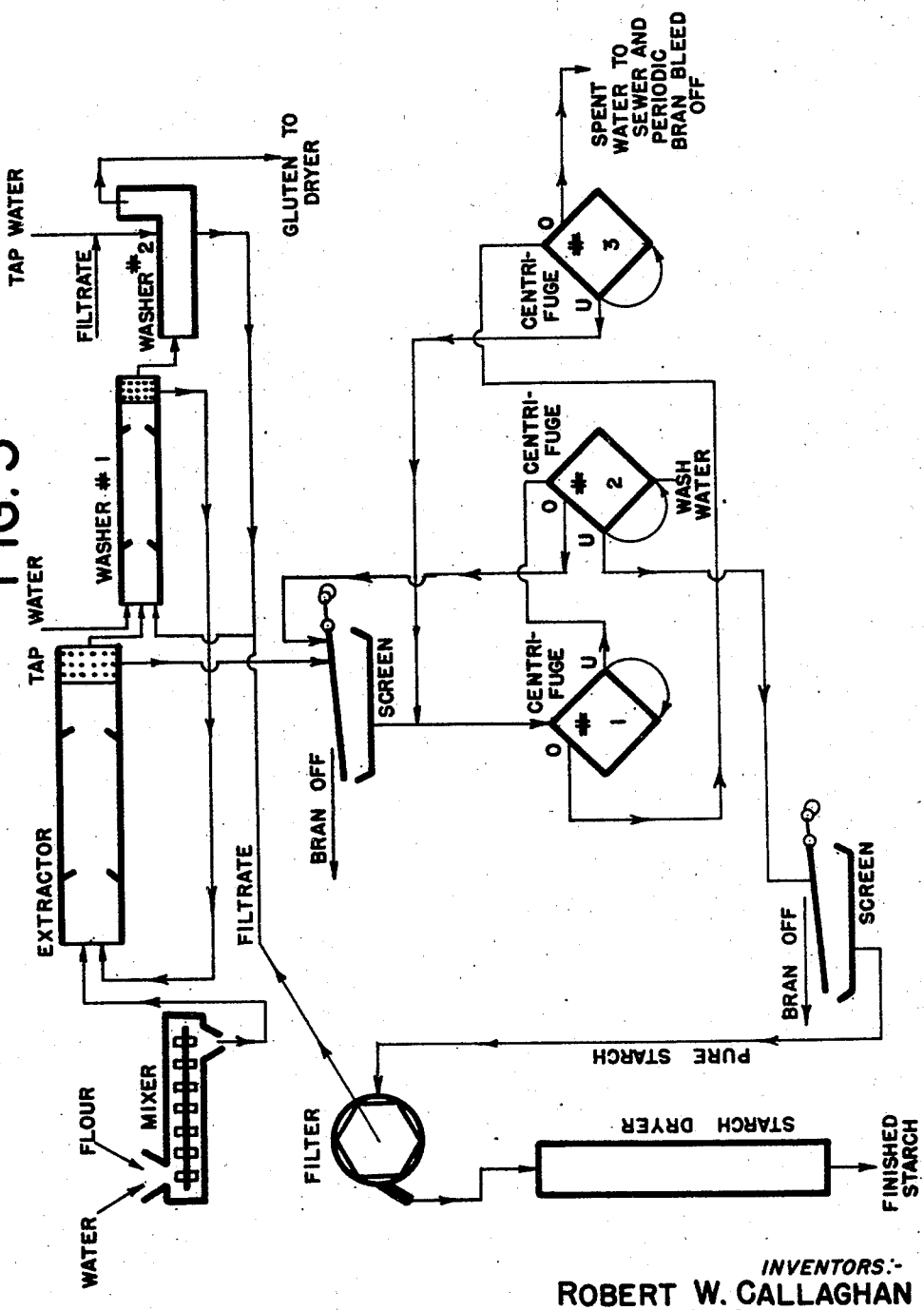

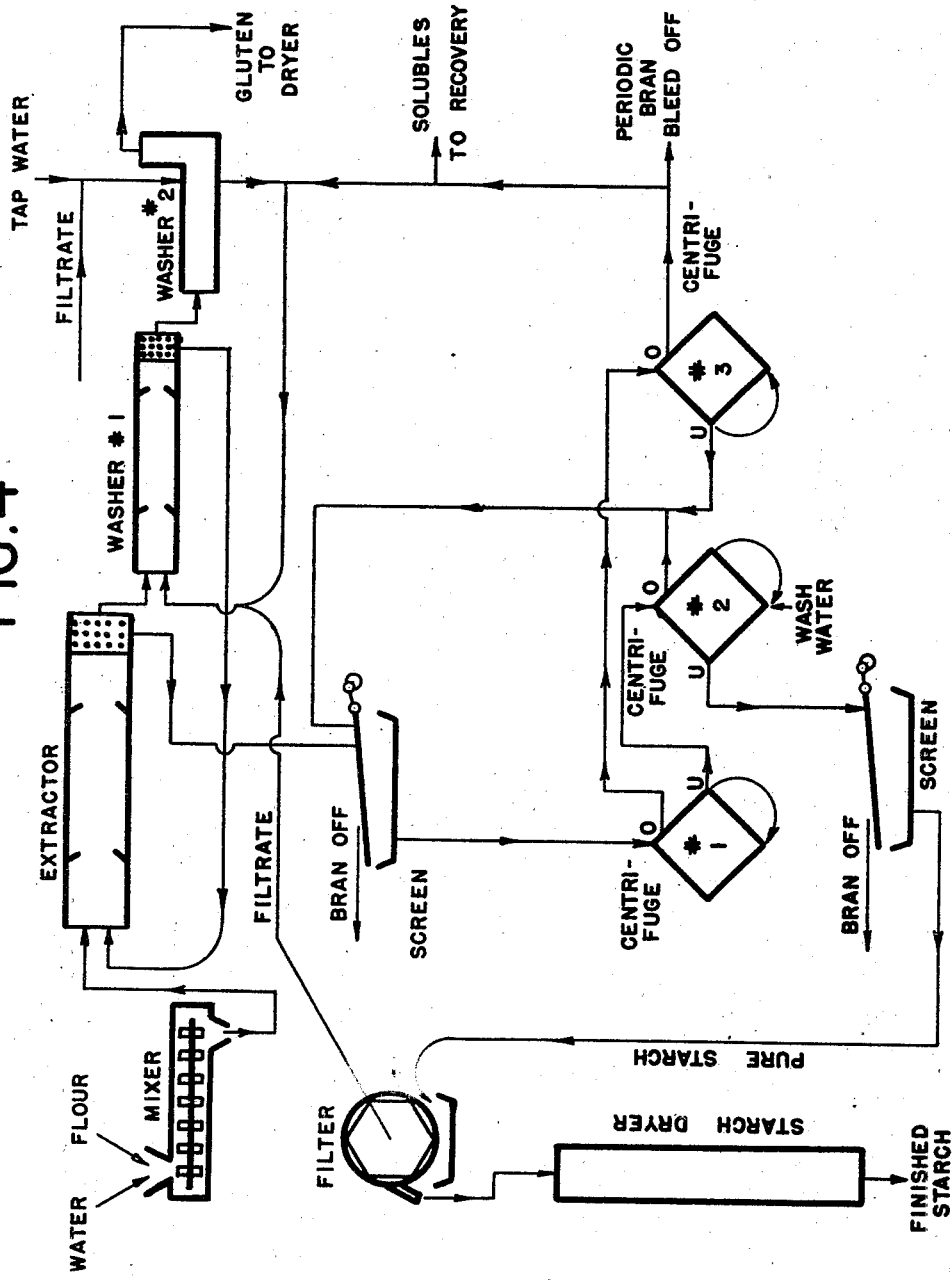

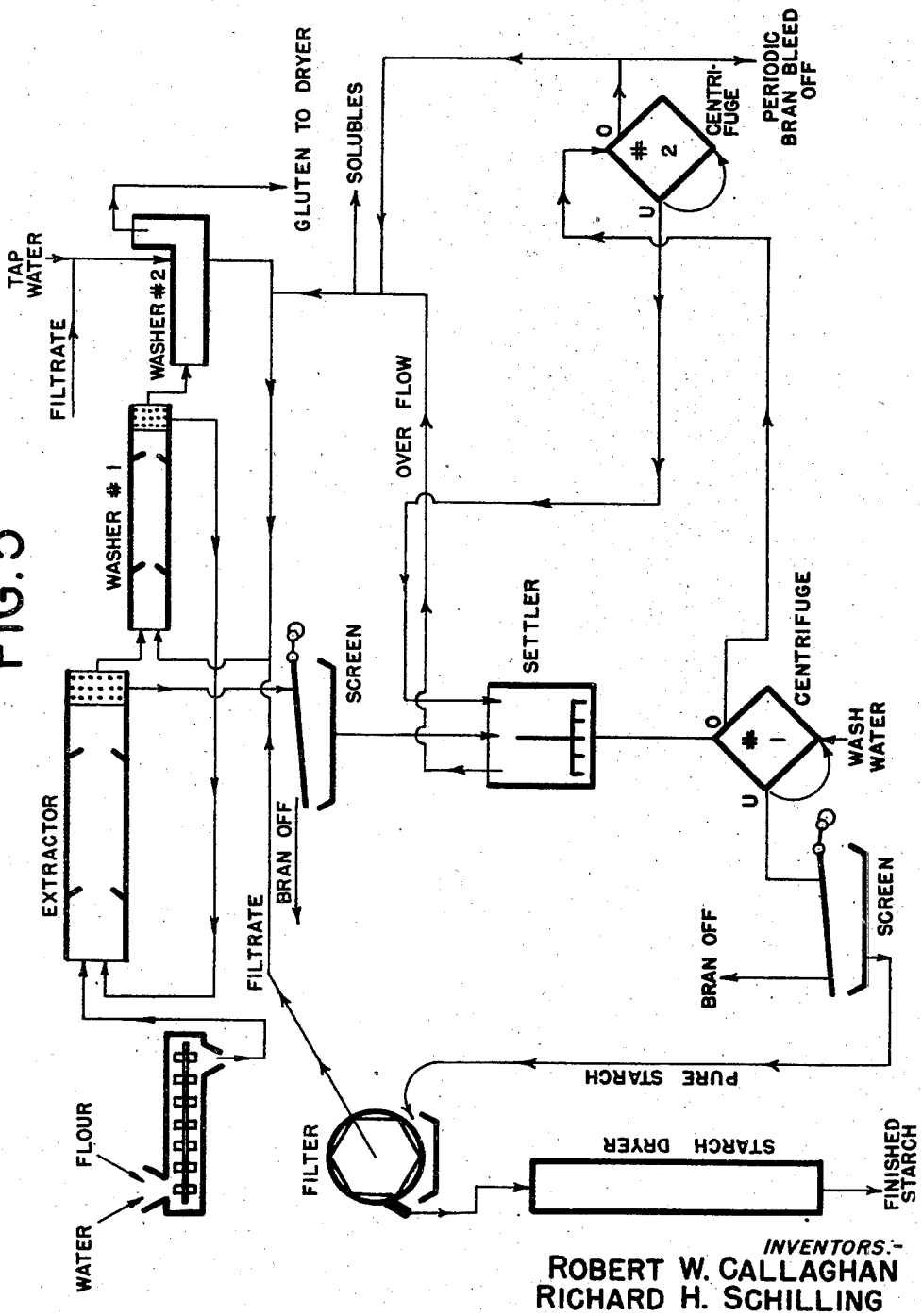

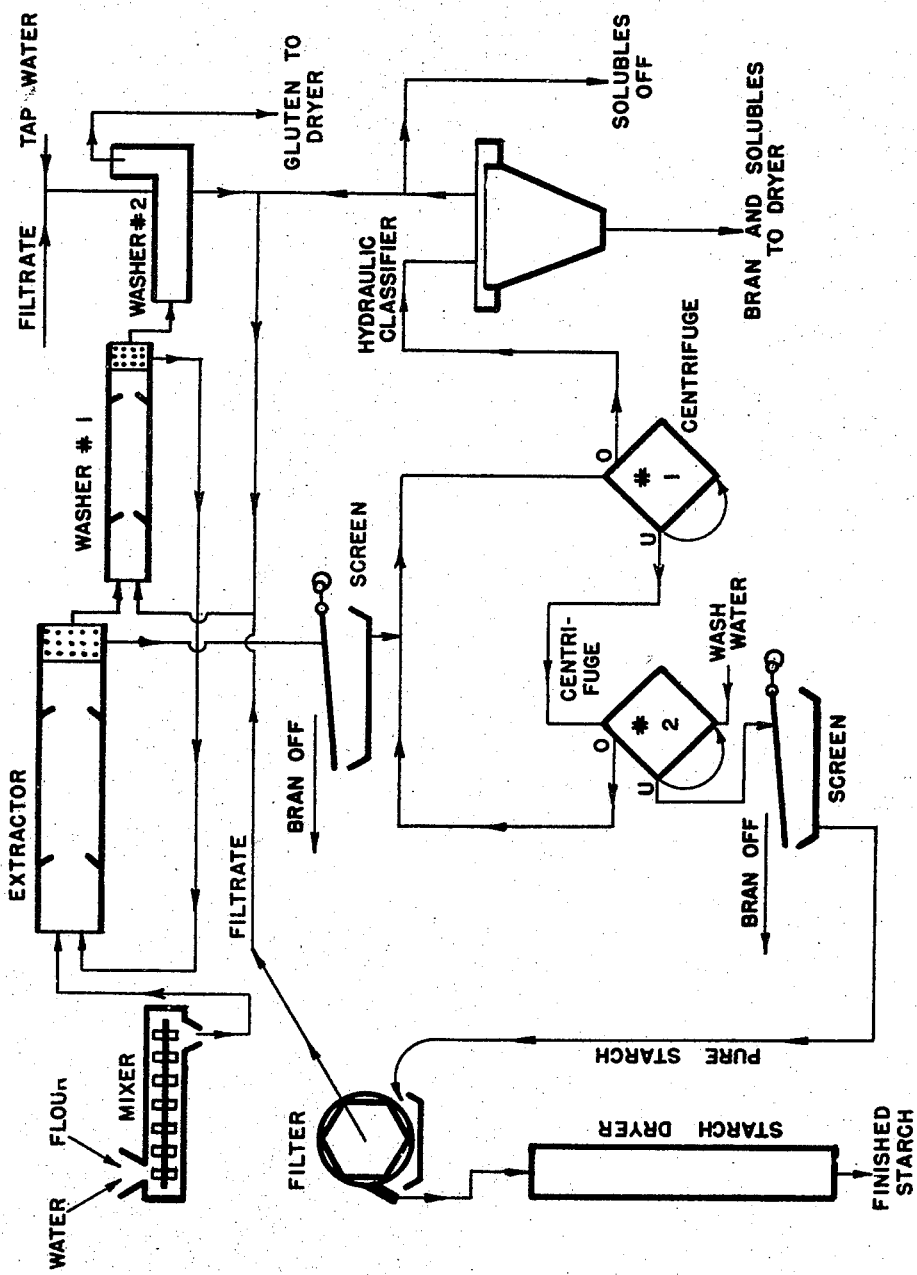

2,418,621

UNITED STATES PATENT OFFICE 2,418,621

WHEAT STARCH PROCESS

Robert W. Callaghan and Richard H. Schilling, Minneapolis, Minn., assignor to General Mills, Inc., a corporation of Delaware Application August 4, 1943, Serial No. 497,408

13 Claims. (Cl. 127—67)

The present invention relates to a process of separating starch from a starch slurry, and more particularly the separation of wheat starch from wheat.

By means of the present invention it is possible to separate and recover a very high percentage of the starch contained in a slurry, particularly slurries resulting from the separation of flour, farina, meal and other wheat products into gluten and starch.

It is therefore a primary object of the present invention to provide a process of recovering starch from a starch slurry so as to increase the yield and at the same time improve the purity of the product.

It is a further object of the present invention to provide a process for the separation of wheat into starch and gluten while permitting the recovery of starch and gluten in relatively pure form and with high yields.

These and other objects of the invention will be apparent from the following description of the invention with particular reference to the drawings which represent flow sheets of various embodiments of the invention.

Broadly, the process involves forming a dough containing starch, gluten and water, washing the dough with water to extract the starch from the gluten, and recovering the starch from the resultant slurry. As to the formation, working, and extraction of the dough, it is preferred to employ the process set forth in detail in the co-pending application of Callaghan and Elverum, Serial No. 383,678, filed March 17, 1941. This process involves the formation of a dough containing starch, gluten and water, the hydration of the dough, and the working of the dough until the gluten has become substantially completely agglomerated. By this it is meant that the dough is composed of a network of gluten fibers, with the starch particles held in the interstices of the network. By obtaining this continuous network of gluten fibers before washing, the dough mass clings together during the washing operation and, as a result, there is practically no tendency for small particles of gluten to break off and separate with the starch. After the gluten has become agglomerated, the dough mass is discharged into a rotary drum and tumbled about relatively sharp projections in the drum in the presence of water to work the starch from the dough to yield a starch slurry. This slurry is separated from the gluten mass by means of a suitable screen or sieve. The gluten discharged from the extracting drum may then be washed in a suitable washing drum as illustrated in the drawing. After the first washing step the gluten may be further washed to the extent desired, depending upon the purity of the product desired. As shown in the drawings, it is preferred to employ one extraction step and two washing steps, although these features may be varied to produce the results desired. It will be seen that the wash water is used in counter-current flow, being introduced first into the second washer, then into the first washer, and finally into the extractor.

In general, the starch slurry obtained from the extractor is subjected to a sequence of steps, namely thickening the slurry to condition it for recovery of starch, separating the slurry into a concentrated starch slurry and a thin slurry composed of bran, starch and water and stripping bran and starch from the thin slurry. These functions are performed in the respective flow sheets in different manners. Each particular flow has advantages as will be pointed out in the specific description of each.

In Fig. 1 the starch slurry removed from the extractor may be passed over a screen for the removal of the larger bran particles. The slurry passing through the screen is then run to a settler which may be of conventional type having a discharge for solids at the bottom and a rake for conveying the settled solids to the discharge. If the settler is of sufficient capacity, the overflow from the settler will be substantially free from suspended solids and will contain only the soluble matter extracted from the flour. This soluble matter may be recovered or may be employed wherever a material having the properties of this material is suitable.

It has been found that the slurry taken off the extractor is composed of relatively large starch particles and also fine starch particles and bran. The fine starch is usually of such a small particle size that it could not be settled within a reasonable time if independent settling of the individual particles had to be relied on. It has been found, however, that the slurry introduced into the settler flocculates, the bran particles appearing to assist in the formation of a floc which, as it settles, sweeps the slurry clear of all suspended particles. By this means it is possible to remove practically all suspended solids from the slurry even though the respective solids have considerably different settling characteristics.

The heavy material discharged from the bottom of the settler is a thickened slurry which may then be run to a centrifugal separator. A centrifuge of the type disclosed in U. S. Patent No.

1,923,455 has been found satisfactory for this purpose. This centrifuge provides for the continuous discharge of concentrated solids as well as the continuous discharge of the liquid overflow. In addition, part of the concentrated solids are internally recycled within the centrifuge and assist in perfecting the separation in the centrifuge. Likewise, this machine provides for the introduction of wash water into the centrifuge which is usually mixed with the internally recycled concentrated solids. In the drawings the centrifuge is illustrated as a square and is shown with the feed entering the top of the centrifuge. The concentrated solids or underflow are indicated by the letter U while the light effluent or overflow is indicated by the letter O. Wash water is shown being introduced into the bottom of the illustrated centrifuge. Likewise, the internally recycled concentrated solids are shown being introduced at the same point as the wash water.

The preliminary concentrating of the solids in the settler has been found to be highly important preparatory to centrifugal separation. A soluble foaming agent of unknown character appears to be present in wheat and this foaming agent finds its way into the starch slurry. Centrifugal separation of a dilute starch slurry usually results in foaming difficulties. When a higher concentration starch slurry is subjected to centrifugal separation, however, these difficulties are not encountered. Likewise, thickening of the feed to the centrifuge increases centrifuge capacity and increases efficiency of starch purification.

The underflow from the centrifuge is a flowable slurry composed essentially of starch and water. This slurry may be run over a screen to remove any remaining bran particles that may have found their way into the purified slurry. After screening, the slurry may be dewatered, for example, by filtering and the filter-cake dried to recover a pure starch. For the purpose of filtration, it is preferred to employ a continuous filter in which the starch slurry may be dewatered and washed. The filtrate may be recovered separately from the wash water or may be mixed with the wash water and recycled to the No. 1 or No. 2 washer, or both, depending on the nature of the filtrate and on the type of gluten product desired.

The overflow from the centrifuge is run over a bran screen for the further removal of bran, after which the overflow is returned to the settler. This overflow contains part of the starch, as a perfect separation is not obtained in the centrifuge. This starch is then returned to the settling operation and part of it will be recovered in a pure form in a subsequent cycle.

It will be apparent from the drawing that bran particles may be removed from the process at a number of points. The largest particles are removed on the first bran screen. In flour, however, many of the bran particles approach the size of the starch granules. Accordingly, many of them pass through this first bran screen. The bran particles, however, tend to swell on prolonged contact with water and as a result a stream withdrawn from the centrifuge will be found to contain bran particles which have swollen to a size permitting their being screened off. While it is preferred to remove substantial quantities of bran on the first bran screen, this may be omitted and the bran removed at the other points.

In this flow diagram the thickening step occurs in the settler, the separating step in the centrifuge, and the stripping of the starch from the centrifuge overflow is performed in a subsequent cycle in the settler.

In Fig. 2 the starch slurry is likewise screened, settled and centrifuged in a manner similar to Fig. 1. The underflow from the centrifuge is similarly processed as in Fig. 1. The overflow from the centrifuge is composed principally of water, bran and fine starch. As was stated previously, the material introduced into the centrifuge contained essentially large starch particles, bran and fine starch. Separation in the centrifuge was effected by means of the density and size differential of the large starch over the remaining bran and fine starch, the latter two having essentially the same settling rate. It has been found that while the bran and fine starch cannot be satisfactorily separated by ordinary settling, because of their tendency to flocculate, they can be separated by taking advantage of the size and density differential in diluted slurries which permits these substances to be separated by hydraulic classification. The overflow from the centrifuge is shown being introduced into a hydraulic classifier in which the relatively larger bran particles settle to the bottom and are removed. The fine starch particles do not settle as rapidly and are washed over the top into the effluent launder. The overflow from this classifier is composed essentially of a dilute fine starch slurry which is recycled to the No. 1 washer which permits part of this starch to be recovered in a subsequent cycle. The bran removed from the bottom of the first classifier contains some starch and accordingly is further purified by passing through a second classifier. The starch-free bran is removed from the bottom of the second classifier and may be recovered or disposed of to waste. The overflow from the second classifier may be introduced into the first classifier as the liquid against which the bran particles must settle. Overflow liquid from the settler may be used as the water introduced into the second classifier against which fine starch particles in the bran slurry must rise to be separated from the settling bran particles. Part of the centrifuge overflow is shown being recycled to the settler for recovery of starch in that manner rather than the entire amount of overflow being recycled to the washer.

In this operation the solubles are found to build up in the system to a considerable concentration and accordingly it is desirable to bleed off a relatively concentrated solution of solubles from the settler overflow. These solubles are valuable and since a reasonably high concentration of them can be obtained in this liquid, the low cost of water removal makes recovery desirable.

It will be noted that the recycling of the fines from the hydraulic classifier back to the gluten washer greatly increases the time during which the starch is subject to fermentation. For this reason it is preferred to employ an antiseptic in the system. For this purpose, the nitrites referred to in the application of Richard H. Schilling, Serial No. 497,407, filed of even date herewith, have been found highly desirable. They appear to inhibit microbial growth to a considerable extent and permit the maintenance of the pH of the system between about 4.5 and 6 at which settling may be efficiently accomplished.

If no antiseptic is employed, there is the possibility of microorganisms, chiefly lactobacilli, bringing the pH to a point below about 4.5 and thus interfering with settling.

The recycling of nitrites into contact with the gluten appears to make the gluten undenaturable by heat. It is thus possible to employ more drastic drying conditions on the gluten without effecting denaturization. This is particularly desirable where an undenatured gluten is wanted. It is thus possible to obtain an undenatured gluten in a simple manner without resorting to the extraordinary precautions heretofore required. In the event that a denatured gluten is desired, the effect of the nitrite may be eliminated by the introduction of a small amount of ammonia. Likewise, it is possible to avoid the effect of nitrite on the gluten by introducing the nitrite into the starch slurry after it has been removed from the extractor and by using fresh wash water in the second hydraulic classifier in place of the overflow from the settler. Thus a large part of the nitrite contained in the centrifuge overflow will be washed out and discharged with the bran slurry and only a trace will be recycled with the fine starch slurry. These starch fines are relatively free from microbial contamination and as only a relatively short time period elapses before these fines are again brought in contact with nitrite, only a slight amount of fermentation takes place. Likewise, little fermentation is encountered in the slurry withdrawn from the extractor, as the period during which no nitrite is present, is short.

In Fig. 3 a three-stage separation is illustrated. The slurry from the extractor is screened for the removal of bran and is then centrifuged. The underflow from the first centrifuge is run through a second centrifuge to yield a second underflow from which starch is recovered in the same manner as in the previous figure. The overflow from the second centrifuge is recycled over the bran screen and returned to the first centrifuge. The overflow from the first centrifuge is run through a third centrifuge to yield a third underflow which is recycled to the first centrifuge and the third overflow which is discharged to waste. Usually the material discharged to waste is sufficiently low in solubles as not to warrant its recovery. Where desired, however, this material may be recovered or diverted to other uses. As the bran particles passing through the bran screen tend to hydrate and swell, as previously described, some bran tends to build up in the centrifuge system. Accordingly, it is found desirable to periodically adjust the operation of the third centrifuge to bleed off a bran stream.

Fig. 4 is quite similar to Fig. 3 with the principal exception that the overflow from the third centrifuge is recycled to the gluten washer. Part of it may be returned to the first washer and part may be returned to the second washer, or all of it may be returned to either. In this manner it is possible to build up the soluble content of the third overflow and make it desirable to recover this material. In this flow the third underflow and the second overflow are united and returned to the bran screen. In this manner there is a lesser tendency for bran to build up in the centrifuge system and accordingly the periodic bran bleed-off from the third overflow need be less frequent.

In Fig. 5 a considerably different flow is illustrated. The screened slurry from the extractor is run to a settler similar to Fig. 1. The underflow from this settler is centrifuged to yield an underflow from which starch is recovered in the previously described manner. The overflow from the first centrifuge is run to a second centrifuge to yield a third underflow which is returned to the settler. The third overflow is recycled to the gluten washers. As in Figs. 3 and 4, bran is periodically bled off this third overflow. The settler may be operated to yield a substantially clear overflow which can be recycled directly to the washer without effecting a further separation as is the case in Figs. 3 and 4.

In Fig. 6 the slurry from the extractor is screened and run to a first centrifuge to yield an underflow which is then run to a second centrifuge, from which the underflow is run to the starch recovery system. The overflow from the second centrifuge is recycled to the first centrifuge. The overflow from the first centrifuge is run to a hydraulic classifier where the bran is settled out and recovered. Part of the overflow from the classifier is recycled to the gluten washers and part of it is diverted for the recovery of solubles.

In the flows shown in Figs. 2, 4, 5 and 6 where recycling is employed, it is usually desirable to employ a preservative such as the nitrite previously described. This is particularly important in the flows illustrated in Figs. 2, 5 and 6 where centrifugal separation is not employed exclusively. The employment of settling requires a prolonged period of time and accordingly the possibilities of fermentation are increased. In the flow of Fig. 4 in which separation is effected by means of centrifuges exclusively, the time period is materially reduced and the extent of fermentation is materially reduced. Nevertheless, it is usually desirable to employ a preservative in this flow also.

It is desired to point out that in all of these flows, starch is recovered at a single point. There is no secondary starch product removed from the system. Accordingly, all of the starch is of prime purity. This is accomplished by recycling various streams containing starch to a point where the starch can be recovered as prime starch. At the same time the bran and solubles of the system can be withdrawn and recovered as desired.

The solubles constitute a valuable by-product. They are composed principally of soluble sugars, amylase, lactates, vitamins and growth factors, and soluble inorganic salts extracted from the flour. This material may be advantageously employed wherever a material of this description is found desirable.

By the term "gravity concentrating" as used herein, it is intended to mean concentrating by difference in specific gravity and is intended to cover simple gravity concentrating as well as where the effect of gravity is multiplied as by means of a centrifuge.

While various modifications of the invention have been disclosed in detail, it will be apparent that the same is not limited thereto but may be varied within the scope of the appended claims.

We claim as our invention:

1. Process of preparing wheat starch which comprises forming a dough containing wheat starch and gluten, working the dough with water to convert said dough into a starch slurry and a gluten mass, separating the starch slurry from the gluten mass, concentrating the slurry by gravity, subjecting the concentrated slurry to centrifugal separation in a separating zone, removing starch therefrom as an underflow and a thin slurry as an overflow, and recovering additional starch from the overflow by returning at least part of it to the concentrating step and thus subjecting it to centrifugal separation in said separating zone.

2. Process of preparing wheat starch which comprises forming a dough containing wheat starch and gluten, working the dough with water to convert said dough into a starch slurry and a gluten mass, separating the starch slurry from the gluten mass, separating bran from the starch slurry, concentrating the slurry by gravity, subjecting the concentrated slurry to centrifugal separation in a separating zone, removing starch therefrom as an underflow and a thin slurry as an overflow, and recovering additional starch from the overflow by returning at least part of it to the concentrating step and thus subjecting it to centrifugal separation in said separating zone.

3. Process of preparing wheat starch which comprises forming a dough containing wheat starch and gluten, working the dough with water to convert said dough into a starch slurry and a gluten mass, separating the starch slurry from the gluten mass, separating bran from the starch slurry, concentrating the slurry by gravity, subjecting the concentrated slurry to centrifugal separation in a separating zone, removing starch therefrom as an underflow and a thin slurry as an overflow, and recovering additional starch from the overflow by returning at least part of it to the concentrating step and thus subjecting it to centrifugal separation in said separating zone, in the presence of a further quantity of slurry.

4. Process of preparing wheat starch which comprises forming a dough containing wheat starch and gluten, working the dough with water to convert said dough into a starch slurry and a gluten mass, separating the starch slurry from the gluten mass, separating bran from the starch slurry, subjecting the slurry to a gravity concentrating step to produce a first underflow and a first overflow, subjecting the first underflow to centrifugal separation to yield a second underflow and a second overflow, recovering starch from the second underflow, returning the second overflow to the gravity concentrating step, and subjecting the first overflow to a gravity separation to yield a third underflow and a third overflow, and recovering starch from the third underflow by returning at least part of it to the concentrating step and thus subjecting it to centrifugal separation in the presence of a further quantity of slurry.

5. Process of preparing wheat starch which comprises forming a dough containing wheat starch and gluten, working the dough with water to convert said dough into a starch slurry and a gluten mass, separating the starch slurry from the gluten mass, separating bran from the starch slurry, subjecting the slurry to a gravity concentrating step to produce a first underflow and a first overflow, subjecting the first underflow to centrifugal separation to yield a second underflow and a second overflow, recovering starch from the second underflow, returning the second overflow to the gravity concentrating step, subjecting the first overflow to a gravity separation to yield a third underflow and a third overflow, and returning the third underflow to the gravity concentrating step.

6. Process of preparing wheat starch which comprises forming a dough containing wheat starch and gluten, working the dough with water to convert said dough into a starch slurry and a gluten mass, separating the starch slurry from the gluten mass, separating bran from the starch slurry, subjecting the slurry to a gravity concentrating step to produce a first underflow and a first overflow, subjecting the first underflow to centrifugal separation to yield a second underflow and a second overflow, recovering starch from the second underflow, returning the second overflow to the gravity concentrating step, subjecting the first overflow to a gravity separation to yield a third underflow and a third overflow, and washing the gluten mass with the third overflow.

7. Process of preparing wheat starch which comprises forming a dough containing wheat starch and gluten, working the dough with water to convert said dough into a starch slurry and a gluten mass, separating the starch slurry from the gluten mass, concentrating the slurry by gravity, subjecting the concentrated slurry to centrifugal separation in a separating zone, removing starch therefrom as an underflow and a thin slurry as an overflow, recovering additional starch from the overflow by returning at least part of it to the concentrating step and thus subjecting it to centrifugal separation in said separating zone, removing water from the underflow, and washing the gluten mass with the water separated from the underflow.

8. Process of preparing wheat starch which comprises forming a dough containing wheat starch and gluten, working the dough with water to convert said dough into a starch slurry and a gluten mass, separating the starch slurry from the gluten mass, subjecting the slurry to a gravity concentrating step to produce a first underflow and an overflow, subjecting the first underflow to centrifugal separation to yield a second underflow and an overflow, recovering starch from the second underflow, and washing the gluten mass with overflow liquid.

9. Process of preparing wheat starch which comprises forming a dough containing wheat starch and gluten, working the dough with water to convert said dough into a starch slurry and a gluten mass, separating the starch slurry from the gluten mass, subjecting the slurry to a gravity concentrating step to produce a first underflow and an overflow, subjecting the first underflow to centrifugal separation to yield a second underflow and an overflow, recovering starch from the second underflow, removing solids from an overflow, and washing the gluten mass with the resultant overflow liquid.

10. Process of preparing wheat starch which comprises forming a dough containing wheat starch and gluten, working the dough with water to convert said dough into a starch slurry and a gluten mass, separating the starch slurry from the gluten mass, concentrating the starch slurry by gravity into a thickened underflow and an overflow, filtering the underflow to recover starch therefrom, washing the gluten with overflow liquid, and then washing the resultant gluten with filtrate from said underflow.

11. Process of preparing wheat starch which comprises forming a dough containing wheat starch and gluten, working the dough with water to convert said dough into a starch slurry and a gluten mass, separating the starch slurry from the gluten mass, subjecting the slurry to a gravity concentrating step to produce a first underflow and a first overflow, subjecting the first underflow to centrifugal separation to yield a second underflow and a second overflow, returning the second overflow to the gravity concentrating step, subjecting the first overflow to a gravity separation to yield a third underflow and a third overflow, washing the gluten mass with the third overflow, filtering the underflow to recover starch therefrom, and washing the preliminarily washed gluten with filtrate from the underflow.

12. Process of preparing wheat starch which comprises forming a dough containing wheat starch and gluten, working the dough with water to convert said dough into a starch slurry and a gluten mass, separating the starch slurry from the gluten mass, subjecting the slurry to a gravity concentrating step to produce an underflow and an overflow, centrifugally separating starch from the underflow, washing the gluten mass with part of the overflow liquid, then working the dough with the overflow liquid from the gluten washing step, and recovering solubles from another part of the overflow liquid.

13. Process of preparing wheat starch which comprises forming a dough containing wheat starch and gluten, working the dough with water to convert said dough into a starch slurry and a gluten mass, separating the starch slurry from the gluten mass, subjecting the slurry to a gravity concentrating step to produce a first underflow and a first overflow, subjecting the first underflow to centrifugal separation to yield a second underflow and a second overflow, returning the second overflow to the gravity concentrating step, subjecting the first overflow to a gravity separation to yield a third underflow and a third overflow, washing the gluten mass with the third overflow, filtering the second underflow to recover starch therefrom, washing the preliminarily washed gluten with filtrate from the second underflow, returning the third overflow from the gluten washing step to the dough working step, and recovering solubles from the third overflow.

ROBERT W. CALLAGHAN.
RICHARD H. SCHILLING.

REFERENCES CITED

The following references are of record in the file of this patent:

UNITED STATES PATENTS

| Number | Name | Date |
| --- | --- | --- |
| 2,149,802 | Thurber | Mar. 7, 1939 |
| 2,013,668 | Peltzer | Sept. 10, 1935 |
| 2,186,037 | Peltzer | Jan. 9, 1940 |
| 2,097,531 | Peltzer | Nov. 2, 1937 |
| 2,323,077 | Peltzer | June 29, 1943 |
| 2,316,807 | Peltzer | Apr. 20, 1943 |
| 1,585,452 | Widmer | May 18, 1926 |

OTHER REFERENCES

Starch—Eynon & Lane, Cambridge, 1928. (Copy in Div. 43, pgs. 144–147.)